(12) United States Patent
Ota

(10) Patent No.: US 9,116,650 B2
(45) Date of Patent: Aug. 25, 2015

(54) IMAGE PROCESSING APPARATUS SIGNING-IN TO SERVER BASED ON SIGN-IN DATA AND EXECUTING ONE OF SCANNING PROCESS AND PRINTING PROCESS

(71) Applicant: Brother Kogyo Kabushiki Kaisha, Nagoya-shi, Aichi-ken (JP)

(72) Inventor: Yuichi Ota, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/281,966

(22) Filed: May 20, 2014

(65) Prior Publication Data

US 2014/0355053 A1    Dec. 4, 2014

(30) Foreign Application Priority Data

May 30, 2013    (JP) .................................. 2013-114534

(51) Int. Cl.
*G06F 3/12*    (2006.01)

(52) U.S. Cl.
CPC ............ *G06F 3/1275* (2013.01); *G06F 3/1214* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 8,370,903 B2 | 2/2013 | Teramoto et al. | |
| 8,699,052 B2 | 4/2014 | Ito | |
| 2006/0012825 A1* | 1/2006 | Kadowaki | 358/1.15 |
| 2008/0074693 A1* | 3/2008 | Hashimoto et al. | 358/1.15 |
| 2008/0282333 A1 | 11/2008 | Teramoto et al. | |
| 2011/0222102 A1 | 9/2011 | Ito | |
| 2014/0325604 A1 | 10/2014 | Nguyenvan | |

FOREIGN PATENT DOCUMENTS

| | | | |
|---|---|---|---|
| JP | 2006-099714 | * | 4/2006 |
| JP | 2008-282216 A | | 11/2008 |
| JP | 2011-191888 A | | 9/2011 |

* cited by examiner

*Primary Examiner* — Jeremiah Bryar
(74) *Attorney, Agent, or Firm* — Banner & Witcoff, Ltd.

(57) ABSTRACT

In an image processing apparatus, a communication device is configured to communicate with a server. A memory stores computer executable instructions that, when executed by the at least one processor, cause the image processing apparatus to: acquire sign-in data from a storing device; automatically sign-in to the server based on the sign-in data; and execute at least one of a scanning process and a printing process. In the scanning process, the at least one processor acquires image data by controlling the image processing device to scan an image, and controls the communication device to transmit the image data to the server. In the printing process, the at least one processor receives print data from the server via the communication device, and controls the image processing device to print an image based on the print data.

17 Claims, 9 Drawing Sheets

FIG. 3

| USER NAME | SIGN-IN ID | SIGN-IN PASSWORD | SERVER URL | ACCESS PRIVILEGE | |
|---|---|---|---|---|---|
| | | | | SCAN | PRINT |
| A | a b c d | 1 2 3 4 | http://www.aaa.com/SV | YES | YES |
| B | e f g h | 5 6 7 8 | http://www.bbb.com/SV/print | NO | YES |
| B | i j k l | 9 0 1 2 | http://www.ccc.com/Serv | YES | NO |
| C | m n o p | 3 4 5 6 | http://www.bbb.com/SV/scan | YES | NO |

| USER NAME | SIGN-IN ID | SIGN-IN PASSWORD | SERVER URL | ACCESS PRIVILEGE | | AUTOMATIC SIGN-IN OPTION |
|---|---|---|---|---|---|---|
| | | | | SCAN | PRINT | |
| A | a b c d | 1 2 3 4 | http://www.aaa.com/SV | YES | YES | ON |
| B | e f g h | 5 6 7 8 | http://www.bbb.com/SV/print | NO | YES | OFF |
| B | i j k l | 9 0 1 2 | http://www.ccc.com/Serv | YES | NO | ON |
| C | m n o p | 3 4 5 6 | http://www.bbb.com/SV/scan | YES | NO | ON |

IMAGE PROCESSING APPARATUS SIGNING-IN TO SERVER BASED ON SIGN-IN DATA AND EXECUTING ONE OF SCANNING PROCESS AND PRINTING PROCESS

CROSS REFERENCE TO RELATED APPLICATION

This application claims priority from Japanese Patent Application No. 2013-114534 filed May 30, 2013. The entire content of the priority application is incorporated herein by reference.

TECHNICAL FIELD

The present invention relates to an image processing apparatus and image processing system that execute image processes using servers.

BACKGROUND

Some multifunction peripherals (MFPs) provide functions that are implemented in conjunction with servers. After the user logs in to the MFP and selects a desired function, a sign-in process is executed in order for the user to use functions on the server. If the sign-in process is successful, the MFP executes an image process related to the function that the user selected.

SUMMARY

However, since the conventional MFP described above executes the sign-in process after the user has selected a function, dead time occurs after the user has selected a function. By the dead time, the user must wait before the image process can be performed. Thus, this process leads to slower response times when executing image processes.

In view of the foregoing, it is an object of the present invention to provide an image processing apparatus and an image-processing system capable of improving the response time for implementing image processes using servers.

In order to attain the above and other objects, the invention provides an image processing apparatus. The image processing apparatus may have a communication device, an image processing device, at least one processor, and a memory. The communication device may be configured to communicate with a server. The memory may store computer executable instructions that, when executed by the at least one processor, may cause the image processing apparatus to: acquire sign-in data from a storing device; automatically sign-in to the server based on the sign-in data; and execute at least one of a scanning process and a printing process. In the scanning process, the at least one processor may acquire image data by controlling the image processing device to scan an image, and control the communication device to transmit the image data to the server. In the printing process, the at least one processor may receive print data from the server via the communication device, and control the image processing device to print an image based on the print data.

According to another aspect, the present invention provides a method for controlling an image processing apparatus having: a communication device configured to communicate with a server; and an image processing device. The method may include: acquiring sign-in data from a storing device; automatically signing-in to the server based on the sign-in data; and executing at least one of a scanning process and a printing process by using the image processing device. In the scanning process, the executing may acquire image data by controlling the image processing device to scan an image, and control the communication device to transmit the image data to the server. In the printing process, the executing may receive print data from the server via the communication device, and control the image processing device to print an image based on the print data.

According to another aspect, the present invention provides a non-transitory computer readable storage medium storing a set of program instructions installed on and executed by a computer for controlling an image processing apparatus having: a communication device configured to communicate with a server; and an image processing device. The program instructions may include: acquiring sign-in data from a storing device; automatically signing-in to the server based on the sign-in data; and executing at least one of a scanning process and a printing process by using the image processing device. In the scanning process, the executing may acquire image data by controlling the image processing device to scan an image, and control the communication device to transmit the image data to the server. In the printing process, the executing may receive print data from the server via the communication device, and control the image processing device to print an image based on the print data.

BRIEF DESCRIPTION OF THE DRAWINGS

The particular features and advantages of the invention as well as other objects will become apparent from the following description taken in connection with the accompanying drawings, in which:

FIG. 3 is an explanatory diagram illustrating a user management table stored in the multifunction peripheral according to the embodiment;

FIG. 8 is an explanatory diagram illustrating another example of a user management table stored in the multifunction peripheral.

DETAILED DESCRIPTION

Figure 1:
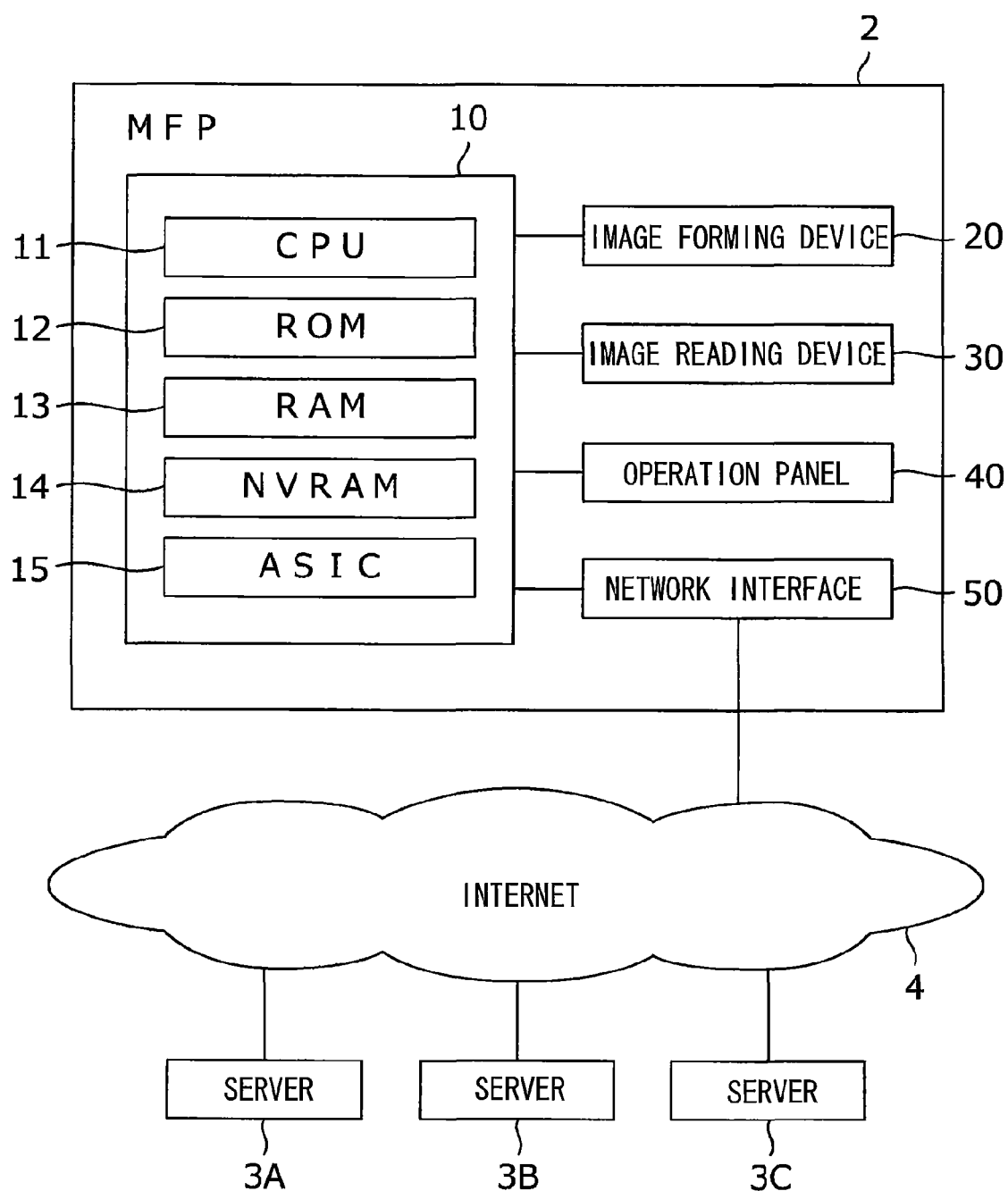
FIG. 1 is a schematic view illustrating an image processing system according to an embodiment of the invention.

An image processing system 1 according to embodiment of the invention will be described while referring to the accompanying drawings wherein like parts and components are designated by the same reference numerals to avoid duplicating description. FIG. 1 shows the image-processing system 1 according to an embodiment of the present invention. The image-processing system 1 includes a multifunction peripheral (MFP) 2 serving as the image processing apparatus of the present invention, and a plurality of servers 3. Only three servers 3A, 3B, and 3C are shown in FIG. 1 as examples. The servers 3A, 3B, and 3C will be collectively called servers 3.

The MFP 2 and the servers 3 are interconnected through an Internet 4 and are capable of communicating with each other.

The MFP 2 includes a control device 10, an image-forming device 20, an image-reading device 30, an operation panel 40, and a network interface 50 serving as a communication device. The MFP 2 is connected to the Internet 4 through the network interface 50.

The control device 10 controls the image-forming device 20, the image-reading device 30, and the operation panel 40 and controls data communications via the network interface 50. Each of the image-forming device 20 and the image-reading device 30 are an example of an image processing device. More specifically, the control device 10 includes a CPU 11, a ROM 12, a RAM 13, a nonvolatile RAM (NVRAM) 14 serving as a storing device, and an application-specific integrated circuit (ASIC) 15. By executing programs for various processes, the CPU 11 controls the operations of components in the MFP 2 and data communications. The ROM 12 stores programs executed by the CPU 11, data required for various processes, and the like. The CPU 11 uses the RAM 13 and the NVRAM 14 as work areas when executing programs.

The image-forming device 20 has an electrophotographic system or inkjet system for printing images on printing paper based on image data. The image-forming device 20 may be configured to print in color or monochrome-only.

The image-reading device 30 scans originals to generate image data.

The operation panel 40 includes a touchscreen and operating buttons. The operation panel 40 displays various information on the touchscreen. By directly touching the touchscreen, the user can input various data. The operating buttons include an OK button for inputting a command to start an image process and a Cancel button for inputting a command to cancel an image process, for example.

Each of the servers 3 provides at least one of a scanning service and a printing service. For the scanning service, the server 3 receives scan data from the MFP 2 over the Internet 4 and saves this scan data in memory. For the printing service, the server 3 transmits print data saved in memory to the MFP 2 over the Internet 4.

Figure 2:
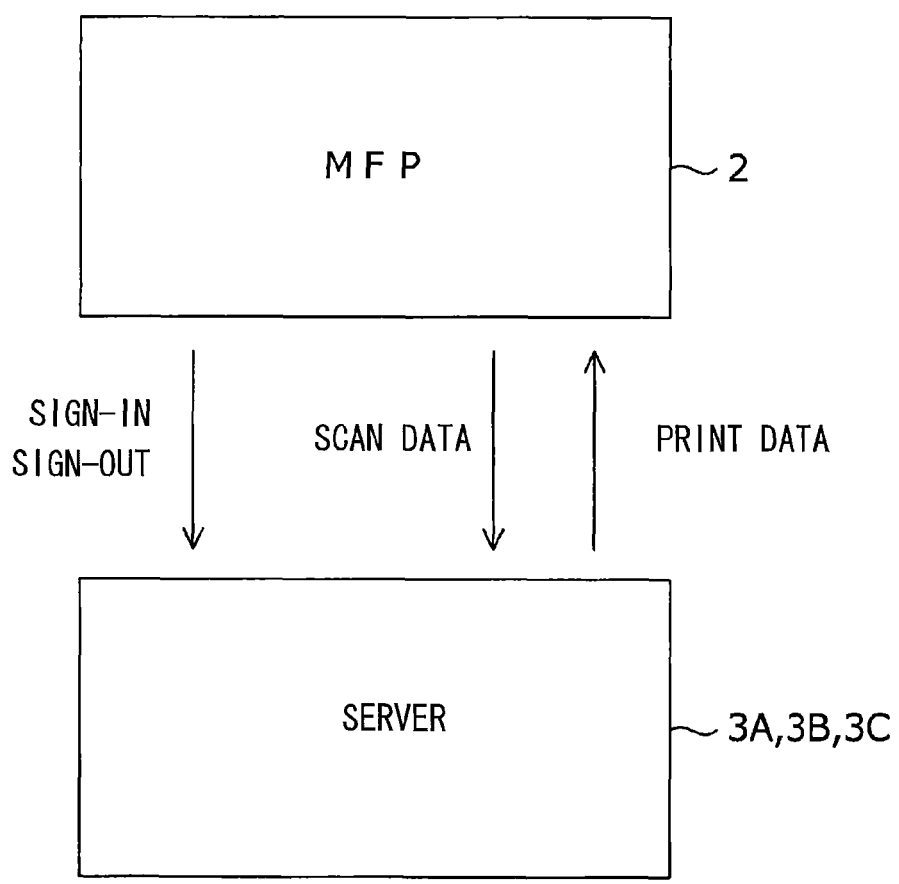
FIG. 2 is an explanatory diagram illustrating operations of a multifunction peripheral and a server according to the embodiment.

As illustrated in FIG. 2, the MFP 2 executes a sign-in process for establishing a signed-in state with a server 3, and a sign-out process for canceling this signed-in state. In the signed-in state, the user can access the server 3. In the sign-in state with the server 3, the user (MFP 2) has permission to use the server. That is, while in the signed-in state, the MFP 2 can also execute a scanning process and a printing process. In the scanning process, the MFP 2 implements an image process (a scan) using the scanning service provided by the server 3. In the printing process, the MFP 2 implements an image process (a print) using the printing service provided by the server 3.

The control device 10 of the MFP 2, and particularly the CPU 11 in the control device 10, executes the sign-in process when the MFP 2 starts up. The CPU 11 uses a user management table 121, such as that shown in FIG. 3, when executing the sign-in process.

The user management table 121 is stored in the NVRAM 14. Sign-in data is recorded in the user management table 121 and, for each user, correlates the username, sign-in ID, sign-in password, server URL, access privileges for the scanning service, and access privileges for the printing service.

As a specific example based on the user management table 121 in FIG. 3, sign-in data for the user with username "A" has been created by correlating username "A" with the sign-in ID "abcd", sign-in password "1234", server URL "http://www.aaa.com/SV", access privileges "Yes" for the scanning service, and access privileges "Yes" for the printing service. The server URL "http://www.aaa.com/SV" in this case is the URL identifying the server 3A.

For the user with username "B", two records of sign-in data have been created in this example. The first record of sign-in data has been created by associating username "B" with the sign-in ID "efgh", sign-in password "5678", server URL "http://www.bbb.com/SV/print", access privileges "No" for the scanning service, and access privileges "Yes" for the printing service. The server URL "http://www.bbb.com/SV/print" is the URL identifying the server 3B.

The second record of sign-in data for the user "B" is created by associating username "B" with the sign-in ID "ijkl", sign-in password "9012", server URL "http://www.ccc.com/Serv", access privileges "Yes" for the scanning service, and access privileges "No" for the printing service. The server URL "http://www.ccc.com/Serv" is the URL identifying the server 3C.

Sign-in data has been created for the user with username "C" by correlating username "C" with the sign-in ID "mnop", sign-in password "3456", server URL "http://www.bbb.com/SV/scan", access privileges "Yes" for the scanning service, and access privileges "No" for the printing service. The server URL "http://www.bbb.com/SV/scan" is the URL identifying the server 3B.

Limits are set on the MFP 2 for each user indicating the maximum amount of scans by the image-reading device 30 and prints by the image-forming device 20 that the user can perform in any given fixed period. The limits may also be set to zero. The user is authorized to use a scanning service until the number of scans executed within the fixed period reaches the limit. Whenever the number of scans performed within the fixed period reaches the limit, the user's access privileges for the scanning service are revoked and the user is prevented from using the service. Similarly, the user is authorized to use the printing service until the number of prints executed within the fixed period reaches the limit. When the number of prints performed within the fixed period reaches the limit, the user's access privileges for the printing service are revoked and the user is prevented from using the service.

Rather than setting a limit for the number of scans and the number of prints, settings may be provided in the MFP 2 for each user indicating whether the user has access to the scanning service and the printing service. A "Yes" is recorded in the scanning service settings of the user management table 121 for a user when the user has authorization to use the scanning service, and a "No" is recorded in the scanning service settings when the user does not have authorization. Similarly, a "Yes" is recorded in the printing service settings of the user management table 121 for a user when the user has authorization to use the printing service, and a "No" is recorded in the printing service settings of the user management table 121 when the user does not have authorization.

Figure 4:
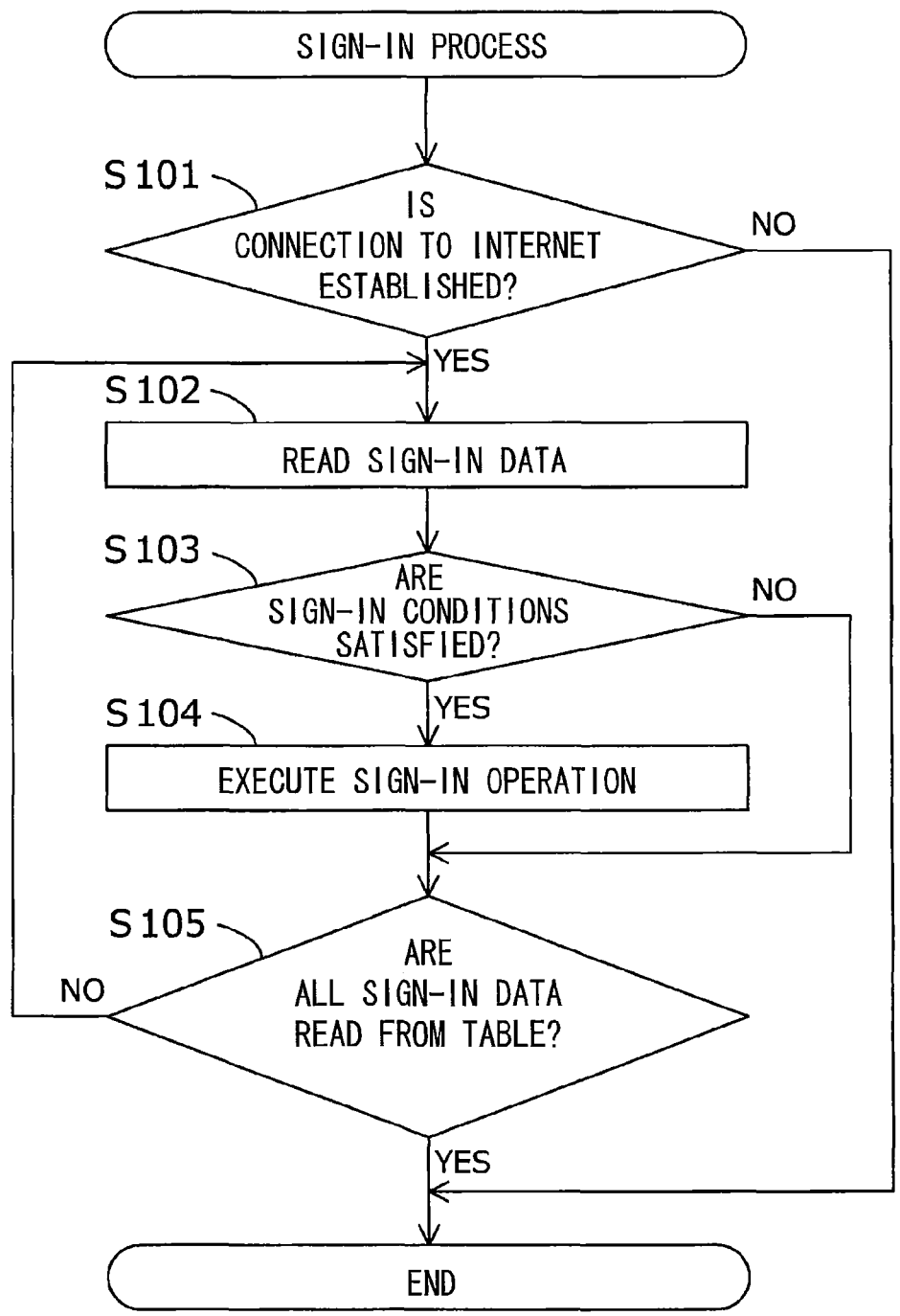
FIG. 4 is a flowchart illustrating a sign-in process according to the embodiment.

Once the MFP 2 is started up, the CPU 11 executes the sign-in process shown in FIG. 4. In S101 of the sign-in process, the CPU 11 determines whether the MFP 2 has established a connection to the Internet 4. The CPU 11 ends the sign-in process without executing the remaining steps (S102-S105) if an Internet connection has not been established (S101: NO).

When the CPU 11 determines that the MFP 2 has established a connection to the Internet 4 (S101: YES), in S102 the CPU 11 reads the first record of sign-in data from the user management table 121.

In S103 the CPU 11 determines whether prescribed sign-in conditions with respect to the sign-in data read in S102 are satisfied. The sign-in conditions include a Condition A and a Condition B described below. The sign-in conditions are satisfied when both Condition A and Condition B are satisfied. Note that Conditions A and B are merely one example, and the sign-in conditions may include conditions other than Conditions A and B or may include other conditions in addition to Conditions A and B.

Condition A: the user has authorization to use the scanning/printing service

Condition B: the image process (scan/print) can be executed

When the sign-in data read from the user management table 121 satisfies the sign-in conditions (S103: YES), in S104 the CPU 11 executes a sign-in operation to sign in to the server 3 identified by the server URL in the sign-in data by transmitting the sign-in ID and the password included in the sign-in data to the identified server 3.

Upon receiving the ID and the password from the MFP 2, the server 3 determines whether this sign-in data is already recorded on the server 3. If the ID and the password are recorded on the server 3, the server 3 issues a notification to the MFP 2 allowing the MFP 2 access to the server 3, whereby the MFP 2 establishes a signed-in state with the server 3. However, if the ID and the password received from the MFP 2 are not recorded on the server 3 as sign-in data, the server 3 issues a notification to the MFP 2 indicating that access to the server 3 is not allowed. In this case, the MFP 2 does not establish a signed-in state with the server 3.

Using the example shown in FIG. 3, the sign-in data for the user A created and stored on the MFP 2 associates the username "A" with the sign-in ID "abcd", the sign-in password "1234", the server URL "http://www.aaa.com/SV", the access privileges "Yes" for the scanning service, and the access privileges "No" for the printing service. Thus, when the CPU 11 reads sign-in data for the user "A" from the user management table 121, the CPU 11 determines that Condition A is satisfied for both the scanning service and the printing service since the user "A" has authorization to use the scanning service and the printing service.

The CPU 11 also determines whether the image-forming device 20 and the image-reading device 30 are able to execute their corresponding image processes. If a malfunction has occurred in the image-forming device 20 or if the MFP 2 is out of printing paper, toner, or ink, for example, the CPU 11 determines that the image-forming device 20 is currently unable to execute an image process. Similarly, if a malfunction or the like has occurred in the image-reading device 30, the CPU 11 determines that the image-reading device 30 is currently unable to execute an image process.

If the CPU 11 determines that both the image-forming device 20 and the image-reading device 30 are ready to execute their respective image processes, the CPU 11 determines that Condition B has been met for both the image-forming device 20 and the image-reading device 30. In this case, the CPU 11 determines that the sign-in conditions have been satisfied, and transmits the sign-in ID "abcd" and the sign-in password "1234" to the server 3A identified in the server URL "http://www.aaa.com/SV". The MFP 2 subsequently establishes a signed-in state with the server 3A, provided that the ID "abcd" and the password "1234" are recorded on the server 3A.

If the image-forming device 20 is currently able to execute an image process while the image-reading device 30 is not currently able to execute an image process (is currently unable to execute an image process), the CPU 11 determines that Condition B is satisfied for the image-forming device 20 but not for the image-reading device 30. In this case, the CPU 11 determines that the sign-in conditions are satisfied since Condition A for the printing service and Condition B for the image-forming device 20 have been met, and transmits the sign-in ID "abcd" and the sign-in password "1234" to the server 3A identified by the server URL "http://www.aaa.com/SV". Subsequently, the MFP 2 establishes a signed-in state with the server 3A, provided that the ID "abcd" and the password "1234" are recorded on the server 3A.

On the other hand, if the image-forming device 20 is not currently able to execute an image process (is currently unable to execute an image process) while the image-reading device 30 is currently able to execute an image process, the CPU 11 determines that Condition B has not been met for the image-forming device 20 but has been met for the image-reading device 30. In this case, the CPU 11 determines that the sign-in conditions are satisfied since Condition A for the scanning service and Condition B for the image-reading device 30 have been met, and transmits the ID "abcd" and the password "1234" to the server 3A identified by the server URL "http://www.aaa.com/SV". Subsequently, the MFP 2 establishes a signed-in state with the server 3A, provided that the ID "abcd" and the password "1234" are recorded on the server 3A. As described above, in the embodiment, the CPU 11 transmits the sing-in ID and the sign-in password to the server 3 when Condition A for one of the services and Condition B for the image process corresponding to the one of the services are satisfied.

However, if the CPU 11 determines in S103 that the sign-in data read from the user management table 121 does not satisfy the sign-in conditions (S103: NO), the CPU 11 skips the sign-in operation of S104 and advances to S105.

In S105 the CPU 11 determines whether all sign-in data (all records) stored in the user management table 121 has been read and processed in the sign-in process. If there remain any records of the sign-in data that have not been read from the user management table 121 (S105: NO), in S102 the CPU 11 reads one previously unread record of the sign-in data from the user management table 121. In S103 the CPU 11 determines whether the sign-in data read from the user management table 121 in S102 meets the sign-in conditions, as described above, and in S104 executes a sign-in operation when the sign-in conditions have been met.

In this way, the CPU 11 sequentially reads records of sign-in data from the user management table 121. When the CPU 11 determines in S105 that all sign-in data (all records) has been read from the user management table 121 and processed (S105: YES), the CPU 11 ends the sign-in process.

Figure 5:
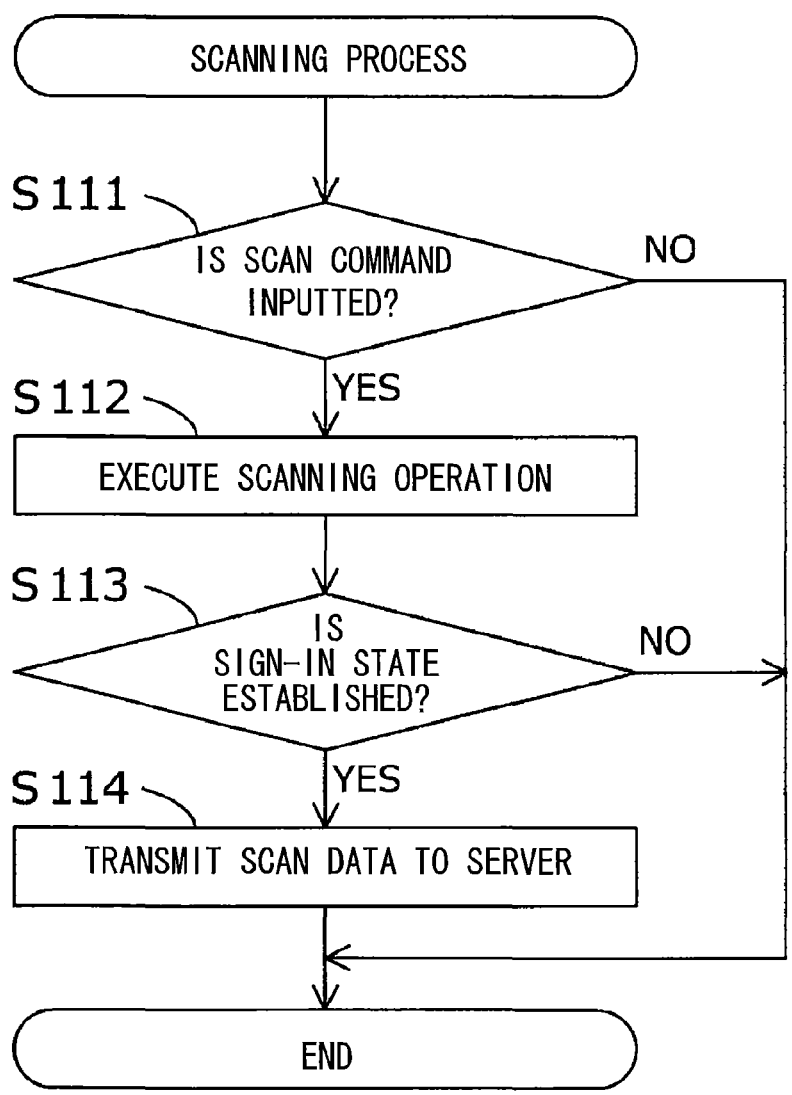
FIG. 5 is a flowchart illustrating a scanning process according to the embodiment.

After completing the sign-in process, the CPU 11 repeatedly executes the scanning process shown in FIG. 5. In the scanning process, the CPU 11 controls the image-reading device 30 to scan an original and transmits image data generated in the scanning operation to the server 3.

In S111 of the scanning process, the CPU 11 determines whether a scan command instructing the MFP 2 to begin a scanning process has been inputted. When the user wishes to scan (read) an original with the image-reading device 30, the user either sets the original in an automatic document feeder (ADF) or places the original on an original platen. The user further touches the touchscreen of the operation panel 40 to input scan conditions for scanning the original. When the user subsequently presses an OK button on the operation panel 40, the operation panel 40 inputs a scan command in the CPU 11. The scan conditions and the scan command may be inputted into the MFP 2 from the user's terminal connected to and capable of communicating with the MFP 2.

When the CPU 11 determines in S111 that no scan command has been inputted (S111: NO), the CPU 11 ends the current scanning process. However, if a scan command has been inputted (S111: YES), in S112 the CPU 11 controls the image-reading device 30 to execute a scanning operation on the original.

In S113 the CPU 11 determines whether a signed-in state has been established on the MFP 2 using the sign-in data for the user that inputted the scan command. If a signed-in state has been established for this user (S113: YES), in S114 the CPU 11 transmits the scan data to the server 3 and subsequently ends the current scanning process. Here, scan data is the image data produced by the image-reading device 30 when scanning the original.

However, if a signed-in state has not been established for the user (S113: NO), the CPU 11 simply ends the current scanning process without transmitting the scan data to the server 3. In such a case, the CPU 11 displays an error message on the touchscreen of the operation panel 40, for example.

Figure 6:
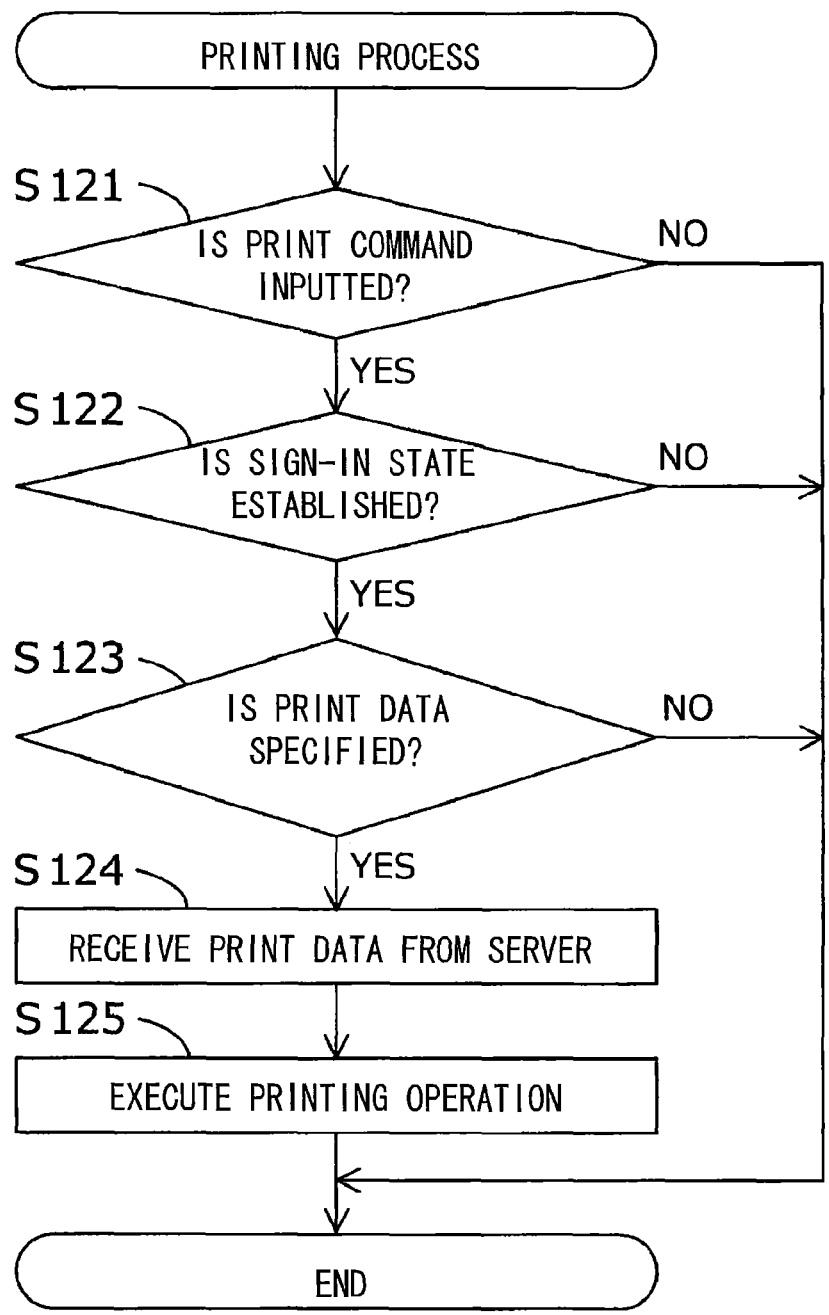
FIG. 6 is a flowchart illustrating a printing process according to the embodiment.

After completing the sign-in process, the CPU 11 also repeatedly executes the printing process shown in FIG. 6. In the printing process, the MFP 2 receives print data from the server 3 and controls the image-forming device 20 to execute a print based on this print data.

In S121 of the printing process, the CPU 11 determines whether a print command instructing the MFP 2 to begin the printing process has been inputted. To input a print command, the user touches the touchscreen of the operation panel 40 and selects the printing service. After the user presses the OK button on the operation panel 40, the operation panel 40 issues a print command to the CPU 11.

If the CPU 11 determines that a print command has not been inputted (S121: NO), the CPU 11 ends the current printing process. However, if a print command has been inputted (S121: YES), in S122 the CPU 11 determines whether a signed-in state has been established for the user that inputted the print command based on sign-in data for this user.

If a signed-in state has been established (S122: YES), in S123 the CPU 11 determines whether data specifying print data to be used in the printing process has been inputted. To input such data, the user first touches the touchscreen of the operation panel 40, for example, to acquire a list of print data saved on the server 3. At this time, the user can select desired print data from the list. After the user has selected desired print data on the operation panel 40, the operation panel 40 transmits data specifying this print data to the CPU 11. When the CPU 11 receives this data, the CPU 11 determines that data specifying print data has been inputted.

If the CPU 11 determines that data specifying print data has not been inputted (S123: NO), the CPU 11 simply ends the current printing process. However, if data specifying print data has been inputted (S123: YES), in S124 the CPU 11 receives the print data specified by the user from the server 3.

In S125 the CPU 11 controls the image-forming device 20 to execute a printing operation based on the print data received in S124 and subsequently ends the current printing process.

On the other hand, if the CPU 11 determines in S122 that a signed-in state has not been established (S122: NO), the CPU 11 simply ends the current printing process. In this case, the CPU 11 displays an error message on the touchscreen of the operation panel 40, for example.

Figure 7:
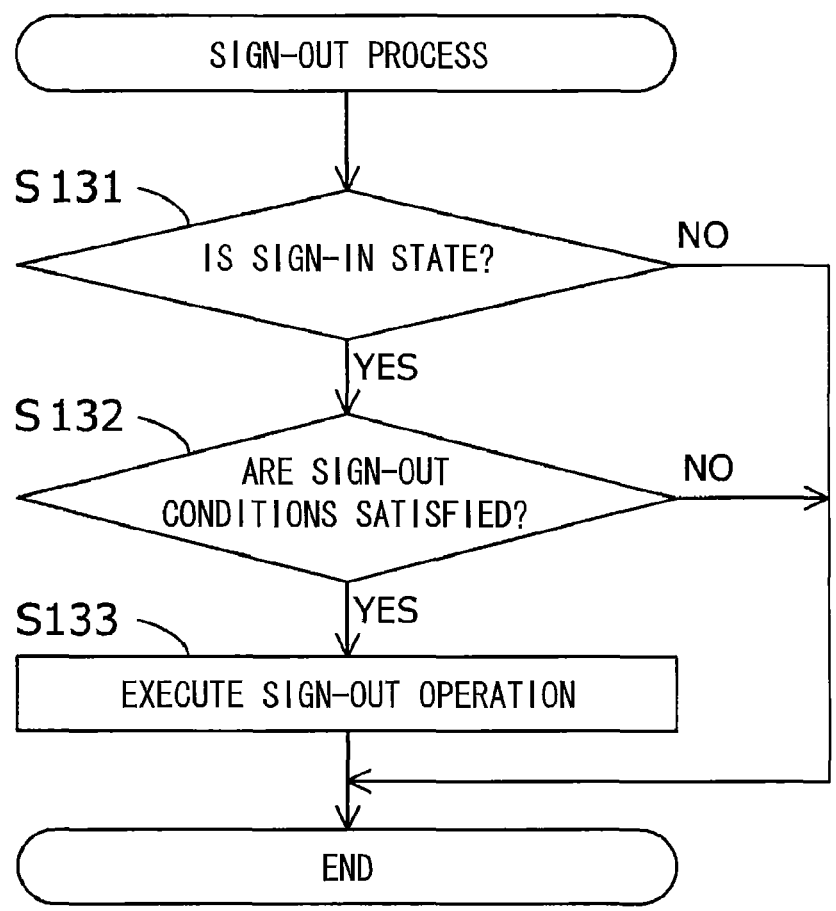
FIG. 7 is a flowchart illustrating a sign-out process according to the embodiment.

The CPU 11 repeatedly executes the sign-out process shown in FIG. 7 for each record of sign-in data recorded in the user management table 121. In S131 of the sign-out process, the CPU 11 determines whether a signed-in state has been established based on the sign-in data.

If a signed-in state has not been established (S131: NO), the CPU 11 ends the sign-out process. However, if a signed-in state has been established (S131: YES), in S132 the CPU 11 determines whether prescribed sign-out conditions have been met. The sign-out conditions include a Condition C and a Condition D described below. The sign-out conditions are satisfied when both Condition C and Condition D are met. Note that Conditions C and D are merely one example, and the sign-out conditions may include conditions other than Conditions C and D or may include other conditions in addition to Conditions C and D.

Condition C: either the user does not have authorization to use the scanning service or the image-reading device 30 is currently unable to execute an image process Condition D: either the user does not have authorization to use the printing service or the image-forming device 20 is currently unable to execute an image process If the sign-out conditions are satisfied (S132: YES), in S133 the CPU 11 cancels the signed-in state with the server 3 identified by the server URL in the sign-in data, that is, executes sign-out operation, and subsequently ends the sign-out process. However, if the sign-out conditions are not satisfied (S132: NO), the CPU 11 ends the current sign-out process without cancelling the signed-in state.

As an example using the sign-in data for the user A in FIG. 3, assume that the MFP 2 has established a signed-in state with the server 3A identified in the server URL "http://www.aaa.com/SV", and the image-forming device 20 is currently unable to execute an image process. Thus, Condition D is satisfied. However, Condition C is not satisfied while the image-reading device 30 is able to execute an image process. Hence, the sign-out conditions are not met and the CPU 11 does not cancel the signed-in state with the server 3A.

The first record of the sign-in data for the user B that was created and recorded in the user management table 121 associates the username "B" with the sign-in ID "efgh", the sign-in password "5678", the server URL "http://www.bbb.com/SV/print", the access privileges "No" for the scanning service, and the access privileges "Yes" for the printing service. A second record of the sign-in data has also been created for the user B that associates the username "B" with the sign-in ID "ijkl", the sign-in password "9012", the server URL "http://www.ccc.com/Serv", the access privileges "Yes" for the scanning service, and the access privileges "No" for the printing service.

As an example using the first and second records of sign-in data for the user B, assume that the MFP 2 has established a signed-in state with both the server 3B identified by server URL "http://www.bbb.com/SV/print" and the server 3C identified by server URL "http://www.ccc.com/Serv". If the image-forming device 20 is incapable of executing an image process in this state, both Conditions C and D are satisfied for the first record of sign-in data, thereby meeting the sign-out conditions. However, Condition C is not satisfied for the second record of sign-in data, and therefore the sign-out conditions are not met, even though Condition D is satisfied. In this case, the CPU 11 cancels the signed-in state with the server 3B but does not cancel the signed-in state with the server 3C.

As described above, the CPU 11 reads sign-in data from the user management table 121 stored in the NVRAM 14 on start-up of the MFP 2 and executes a sign-in operation using this sign-in data. If the sign-in operation is successful, the MFP 2 establishes a signed-in state with the server 3. Thereafter, a sign-in operation is no longer necessary when executing an image process using the server 3. Accordingly, the MFP 2 can quickly execute an image process in response to a user-inputted command, thereby improving the response time to execute image processes using the server 3.

The CPU 11 of the MFP 2 determines whether sign-in data read from the user management table 121 satisfies sign-in conditions in order to select which sign-in data to use for establishing a signed-in state. Subsequently, the CPU 11 executes a sign-in operation using the sign-in data that was found to satisfy the sign-in conditions. In this way, the MFP 2 can avoid executing unnecessary sign-in operations using sign-in data that does not satisfy the sign-in conditions.

One of the sign-in conditions is a Condition A that requires the user associated with the sign-in data to have authorization to use the scanning/printing service (authorization to execute an image process using the server 3). Accordingly, if the user does not have authorization to execute an image process using the server 3, the MFP 2 can avoid executing the sign-in operation using the sign-in data associated with that user.

Another sign-in condition is a Condition B that requires the MFP 2 to be capable of executing an image process using the server 3. If the MFP 2 is currently unable to execute an image process using the server 3, the MFP 2 can avoid executing a sign-in operation for the server 3.

After establishing a signed-in state, the MFP 2 determines whether the sign-in data satisfies sign-out conditions for determining whether to cancel the signed-in state based on the sign-in data. The MFP 2 cancels the signed-in state upon determining that the sign-in data satisfies the sign-out conditions. Accordingly, the MFP 2 can cancel the signed-in state when it is no longer necessary to maintain this state, thereby reducing load on the server 3.

As another example, the MFP 2 may be configured for allowing each user to set an option indicating whether to automatically sign in to the servers 3 using the sign-in data. This option improves user-friendliness.

FIG. 8 shows the user management table 121 configured for this automatic sign-in option. As shown in FIG. 8, each record of sign-in data in the user management table 121 includes data indicating whether to execute an automatic sign-in using the sign-in data.

Figure 9:
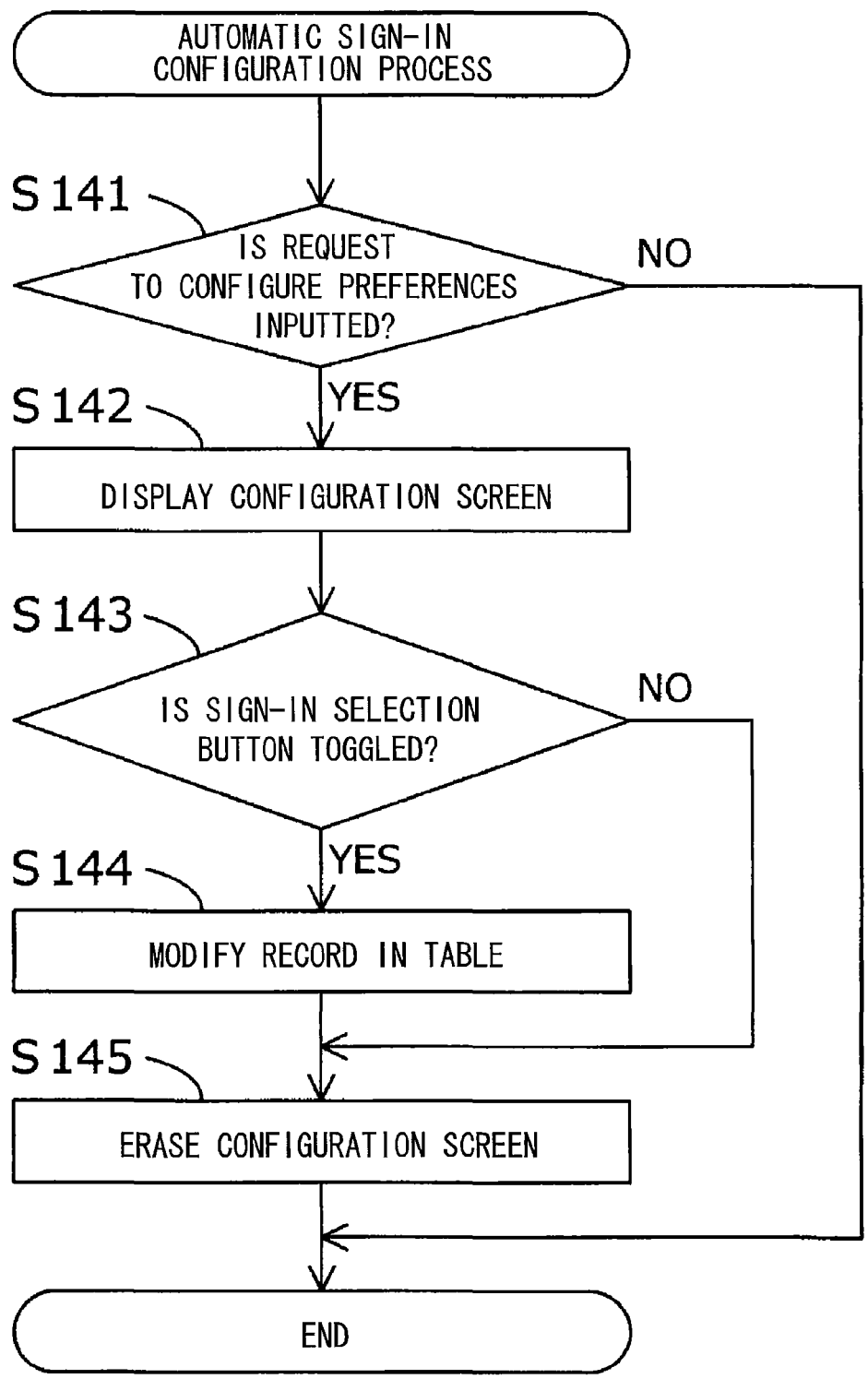
FIG. 9 is a flowchart illustrating a sign-in configuration process.

The CPU 11 repeatedly executes a process to set the automatic sign-in option. As shown in the automatic sign-in configuration process of FIG. 9, in S141 the CPU 11 determines whether the user has inputted a request to configure preferences by touching the touchscreen of the operation panel 40.

If a request to configure preferences was not inputted (S141: NO), the CPU 11 ends the current automatic sign-in configuration process. However, when a request was inputted to configure preferences (S141: YES), in S142 the CPU 11 controls the operation panel 40 to display a configuration screen on the touchscreen for setting the option to execute an automatic sign-in. The configuration screen includes an automatic sign-in selection button for selecting the option to sign in automatically. The option is toggled on and off each time the button is pressed. In other words, if the user presses the automatic sign-in selection button while the button is in an OFF state, the button switches from OFF to ON. Conversely, when the user presses the button while the button is in an ON state, the button switches from ON to OFF.

In S143, the CPU 11 determines whether the automatic sign-in selection button is toggled. If the automatic sign-in selection button is toggled (S143: YES), in S144 the CPU 11 modifies the data recorded in the table 121 to reflect this change. That is, if the automatic sign-in selection button was previously set to OFF and the user sets the button to ON, the CPU 11 determines that the user has selected the option to execute automatic sign-ins and records data indicating this preference in the sign-in data for the user that inputted the request. On the other hand, if the automatic sign-in selection button was previously set to ON and the user sets it to OFF, the CPU 11 determines that the user has canceled the option to execute automatic sign-ins and records data indicating this preference in the sing-in data for the user that inputted the request.

However, if the automatic sign-in selection button is not changed (S143: NO), the CPU 11 maintains the current setting for the user that inputted the request.

Subsequently, in S145 the CPU 11 erases the configuration screen from the touchscreen of the operation panel 40 and ends the automatic sign-in configuration process.

When the MFP 2 has been configured to allow each user to set preferences for automatically signing in to the servers 3 using sign-in data, the CPU 11 may determine in the sign-in process of FIG. 4 that the sign-in conditions are satisfied when, in addition to Conditions A and B, a condition requiring the automatic sign-in option to be ON is satisfied, for example. Alternatively, the CPU 11 may determine that the sign-in conditions are satisfied when, in place of Conditions A and B, the condition requiring the automatic sign-in option to be ON is satisfied, for example.

While the invention has been described in detail with reference to the embodiments thereof, it would be apparent to those skilled in the art that various changes and modifications may be made therein without departing from the scope of the invention.

The CPU 11 may determine that the sign-in conditions are satisfied when other conditions are met in addition to Conditions A and B. For example, the sign-in conditions may include, in addition to Conditions A and B, a condition requiring the MFP 2 to be connected to and capable of communicating with the terminal (e.g., personal computer) operated by the user. The CPU 11 may then determine that the sign-in conditions are satisfied when all three of these conditions are met.

Alternatively, the CPU 11 may determine that the sign-in conditions are satisfied when different conditions than Conditions A and B are met. For example, the condition requiring the MFP 2 to be connected to and capable of communicating with the terminal (e.g., personal computer) operated by the user may serve as the sign-in condition in place of Conditions A and B. In this case, the CPU 11 determines that the sign-in conditions are satisfied when the above condition is met.

While the CPU 11 executes the various processes in the embodiment described above, a portion of these processes may be executed by the ASIC 15. The CPU 11 in conjunction with the ASIC 15 may execute the above processes. Alternatively, the control device 11 may be provided with a plurality of CPUs that share execution of the processes described above.

The multifunction peripheral 2 described in the embodiment is an example of the image processing apparatus according to the present invention. However, the image processing apparatus of the present invention may be applied to a standalone printing apparatus or a standalone image-reading apparatus.

What is claimed is:
1. An image processing apparatus comprising:
a communication device configured to communicate with a server;
an image processing device;
at least one processor; and
a memory storing computer executable instructions that, when executed by the at least one processor, cause the image processing apparatus to:
acquire sign-in data from a storing device;

automatically sign-in to the server based on the sign-in data; determine whether a prescribed sign-out condition is met;

sign-out from the server when the prescribed sign-out condition is met; and execute at least one of a scanning process and a printing process, wherein in the scanning process, the at least one processor acquires image data by controlling the image processing device to scan an image, and controls the communication device to transmit the image data to the server, wherein in the printing process, the at least one processor receives print data from the server via the communication device, and controls the image processing device to print an image based on the print data, and wherein the computer executable instructions, when executed by the at least one processor, further cause the image processing apparatus to perform automatic sign-in to the server in response to start-up of the image processing apparatus.

2. The image processing apparatus according to claim 1, wherein the computer executable instructions, when executed by the at least one processor, further cause the image processing apparatus to determine whether a prescribed sign-in condition is met based on the sign-in data, wherein the image processing apparatus automatically signs in to the server when the prescribed sign-in condition is met.

3. The image processing apparatus according to claim 2, wherein the sign-in data in the storing device is assigned to a user, wherein the sign-in condition is that the user has access privileges for executing at least one of the scanning process and the printing process.

4. The image processing apparatus according to claim 1, wherein the computer executable instructions, when executed by the at least one processor, further cause the image processing apparatus to perform settings whether to automatically sign-in to the server, and whether to automatically sign-in to the server based on the settings.

5. A method for controlling an image processing apparatus having: a communication device configured to communicate with a server; and an image processing device, the method comprising:

acquiring sign-in data from a storing device;

automatically signing-in to the server based on the sign-in data in response to start-up of the image processing apparatus;

determining whether a prescribed sign-out condition is met;

signing-out from the server when the prescribed sign-out condition is met; and executing at least one of a scanning process and a printing process by using the image processing device, wherein in the scanning process, the executing acquires image data by controlling the image processing device to scan an image, and controls the communication device to transmit the image data to the server, and wherein in the printing process, the executing receives print data from the server via the communication device, and controls the image processing device to print an image based on the print data.

6. The method according to claim 5, further comprising determining whether a prescribed sign-in condition is met based on the sign-in data, wherein the automatically signing-in to the server is performed when the prescribed sign-in condition is met.

7. The method according to claim 6, wherein the sign-in condition includes a condition that the image processing apparatus is capable of being used in at least one of the scanning process and the printing process.

8. The method according to claim 6, wherein the sign-in data in the storing device is assigned to a user, wherein the sign-in condition is that the user has access privileges for executing at least one of the scanning process and the printing process.

9. The method according to claim 5, further comprising performing settings whether to automatically sign-in to the server, and whether to automatically sign-in to the server based on the settings.

10. The method according to claim 5, wherein a plurality of sets of sign-in data is stored in the storing device, the plurality of sets of sign-in data including the sign-in data, each of the plurality of sets of sign-in data being used to sign-in to a corresponding server, wherein the method further comprises acquiring the plurality of sets of sign-in data from the storing device, and signing-in to the corresponding server based on the plurality of sets of sign-in data.

11. A non-transitory computer readable storage medium storing a set of program instructions installed on and executed by a computer for controlling an image processing apparatus having:

a communication device configured to communicate with a server; and an image processing device, the program instructions comprising:

acquiring sign-in data from a storing device;

automatically signing-in to the server based on the sign-in data in response to start-up of the image processing apparatus;

determining whether a prescribed sign-out condition is met;

signing-out from the server when the prescribed sign-out condition is met; and executing at least one of a scanning process and a printing process by using the image processing device, wherein in the scanning process, the executing acquires image data by controlling the image processing device to scan an image, and controls the communication device to transmit the image data to the server, and wherein in the printing process, the executing receives print data from the server via the communication device, and controls the image processing device to print an image based on the print data.

12. The non-transitory computer readable storage medium according to claim 11, further comprising determining whether a prescribed sign-in condition is met based on the sign-in data, wherein the automatically signing-in to the server is performed when the prescribed sign-in condition is met.

13. The non-transitory computer readable storage medium according to claim 12, wherein the sign-in condition includes a condition that the image processing apparatus is capable of being used in at least one of the scanning process and the printing process.

14. The non-transitory computer readable storage medium according to claim 12, wherein the sign-in data in the storing device is assigned to a user, wherein the sign-in condition is that the user has access privileges for executing at least one of the scanning process and the printing process.

15. The non-transitory computer readable storage medium according to claim 11, wherein a plurality of sets of sign-in data is stored in the storing device, the plurality of sets of sign-in data including the sign-in data, each of the plurality of sets of sign-in data being used to sign-in to a corresponding server,
  wherein the program instructions further comprise acquiring the plurality of sets of sign-in data from the storing device, and signing-in to the corresponding server based on the plurality of sets of sign-in data.

16. An image processing apparatus comprising:
a communication device configured to communicate with a server;
an image processing device;
at least one processor; and
a memory storing computer executable instructions that, when executed by the at least one processor, cause the image processing apparatus to:
  acquire sign-in data from a storing device;
  automatically sign-in to the server based on the sign-in data; and
  determine whether a prescribed sign-in condition is met based on the sign-in data; and
  execute at least one of a scanning process and a printing process,
wherein in the scanning process, the at least one processor acquires image data by controlling the image processing device to scan an image, and controls the communication device to transmit the image data to the server,
wherein in the printing process, the at least one processor receives print data from the server via the communication device, and controls the image processing device to print an image based on the print data,
wherein the image processing apparatus automatically signs-in to the server when the prescribed sign-in condition is met, and
wherein the sign-in condition includes a condition that the image processing apparatus is capable of executing at least one of the scanning process and the printing process.

17. An image processing apparatus comprising:
a communication device configured to communicate with a server;
an image processing device;
at least one processor; and
a memory storing computer executable instructions that, when executed by the at least one processor, cause the image processing apparatus to:
  acquire sign-in data from a storing device;
  automatically sign-in to the server based on the sign-in data; and
  execute at least one of a scanning process and a printing process,
wherein in the scanning process, the at least one processor acquires image data by controlling the image processing device to scan an image, and controls the communication device to transmit the image data to the server,
wherein in the printing process, the at least one processor receives print data from the server via the communication device, and controls the image processing device to print an image based on the print data,
wherein a plurality of sets of sign-in data is stored in the storing device, the plurality of sets of sign-in data including the sign-in data, each of the plurality of sets of sign-in data being used to sign-in to a corresponding server, and
wherein the image processing apparatus is configured to acquire the plurality of sets of sign-in data from the storing device, and sign-in to the corresponding server based on the plurality of sets of sign-in data.

* * * * *